United States Patent [19]

Lee et al.

[11] Patent Number: 5,733,480

[45] Date of Patent: Mar. 31, 1998

[54] SEMICONDUCTIVE EXTRUDABLE POLYOLEFIN COMPOSITIONS AND ARTICLES

[75] Inventors: Chun D. Lee, Cincinnati; Mark F. McManus, Mason, both of Ohio

[73] Assignee: Quantum Chemical Corporation, Cincinnati, Ohio

[21] Appl. No.: 718,888

[22] Filed: Sep. 24, 1996

[51] Int. Cl.$^6$ .............................. H01B 1/24; C08K 3/04; B32B 5/16; B32B 7/02
[52] U.S. Cl. ..................... 252/511; 106/476; 524/496; 428/221; 428/332; 428/339
[58] Field of Search ..................... 252/510, 511; 106/476; 524/496; 264/105; 428/221, 303, 332, 339

[56] References Cited

U.S. PATENT DOCUMENTS

| | | | |
|---|---|---|---|
| 3,963,647 | 6/1976 | Straub | 252/511 |
| 4,066,576 | 1/1978 | Bork et al. | 252/511 |
| 4,265,789 | 5/1981 | Chistopherson et al. | 252/511 |
| 4,312,937 | 1/1982 | Kasper et al. | 430/496 |
| 4,421,678 | 12/1983 | Mehta | 252/511 |
| 4,452,846 | 6/1984 | Akao | 428/220 |
| 4,493,788 | 1/1985 | Fujie et al. | 252/511 |
| 4,545,926 | 10/1985 | Fouts, Jr. et al. | 252/511 |
| 4,546,038 | 10/1985 | Yamaguchi et al. | 428/323 |
| 4,585,578 | 4/1986 | Yonahara et al. | 252/511 |
| 4,587,039 | 5/1986 | Yamaoka et al. | 252/511 |
| 4,588,855 | 5/1986 | Kutsuwa et al. | 174/120 SC |
| 4,701,359 | 10/1987 | Akao et al. | 428/35 |
| 4,719,039 | 1/1988 | Leonardi | 252/511 |
| 4,800,126 | 1/1989 | Leonardi | 428/420 |
| 4,812,358 | 3/1989 | Miyake et al. | 428/323 |
| 4,857,232 | 8/1989 | Burns, Jr. | 252/511 |
| 4,871,613 | 10/1989 | Akao et al. | 428/328 |
| 4,929,388 | 5/1990 | Wessling | 252/500 |
| 4,971,726 | 11/1990 | Maeno et al. | 252/511 |
| 5,004,561 | 4/1991 | Nomura et al. | 252/511 |
| 5,106,538 | 4/1992 | Barma et al. | 252/511 |
| 5,174,924 | 12/1992 | Yamada et al. | 252/511 |
| 5,214,091 | 5/1993 | Tanaka et al. | 524/425 |
| 5,360,701 | 11/1994 | Elton et al. | 430/501 |
| 5,399,295 | 3/1995 | Gamble et al. | 252/511 |
| 5,407,725 | 4/1995 | Ryoke et al. | 428/141 |
| 5,476,612 | 12/1995 | Wessling et al. | 252/511 |
| 5,484,838 | 1/1996 | Helms et al. | 524/496 |
| 5,487,847 | 1/1996 | Mahabadi et al. | 252/511 |
| 5,498,372 | 3/1996 | Hedges | 252/511 |

OTHER PUBLICATIONS

DeGussa AG: "Technical Bulletin Pigments: DeGussa Pigment Blacks for Conductive Coatings; No. 65." (32 pages) West Germany (Sep. 1990).

DeGussa AG: "Technical Bulletin Pigments: Carbon Black for Conductive Plastics; No. 69" (20 pages) West Germany (Jul. 1990).

*Primary Examiner*—Paul Lieberman
*Assistant Examiner*—Mark Kopec
*Attorney, Agent, or Firm*—Gerald A. Baracka; William A. Heidrich

[57] ABSTRACT

Semiconductive polyolefin formulations are provided which are readily extrudable into films and coatings having low surface resistivity. The formulations of the invention are comprised of a polyethylene resin with 6 to 15 weight percent of a mixture of two different conductive carbon blacks. The conductive blacks have different structures as defined by their BET surface areas and dibutyl phthalate adsorption numbers. The extrudable semiconductive compositions of the invention have complex viscosities of 3000 to 10000 poise and dispersion numbers from 50 to 600. Extruded films having surface resistivities of less than 10 log ohms produced from the above-identified polyolefin compositions are also provided.

28 Claims, No Drawings

SEMICONDUCTIVE EXTRUDABLE POLYOLEFIN COMPOSITIONS AND ARTICLES

BACKGROUND OF THE INVENTION

1. Field of the Invention

This invention relates to semiconductive polyolefin compositions which are readily extrudable into films and coatings having superior conductivity, i.e., low surface resistivity.

2. Description of the Prior Art

It is known that polyolefins, which are inherently nonconductive materials, can be modified to impart varying degrees of electrical conductivity by incorporating carbon black into the resins. U.S. Pat. No. 4,587,039, for example, discloses electrically conductive resin compositions comprising an ethylene α-olefin copolymer and 10 to 60 weight percent carbon black. U.S. Pat. No. 5,174,924 discloses conductive polymer compositions comprised of a crystalline polymer and 40 to 100 phr carbon black. Cable conductor shield compositions wherein mixtures of ethylene-vinyl acetate copolymer and polyethylene are combined with carbon black are disclosed in U.S. Pat. No. 4,857,232. Mixtures of low density polyethylene and rubber have also been combined with 8.5 to 15 percent highly conductive carbon black in U.S. Pat. No. 4,066,576 to produce films having low surface resistance. U.S. Pat. No. 4,265,789 discloses a flexible conductive composition suitable for injection molding or extrusion comprised of carbon black in a polymer matrix composed of two phases—a soft elastomeric phase and a hard crystalline phase. Electrostatically paintable compositions containing carbon black are disclosed in U.S. Pat. Nos. 3,963,647 and 5,484,838 and a foamable electroconductive polyolefin resin composition containing 5 to 30 weight percent furnace black is disclosed in U.S. Pat. No. 4,493,788.

Carbon black also has been utilized with other fillers, such as talc, silica, clays, etc., to produce electrically conductive materials. Compositions of this type are disclosed in U.S. Pat. Nos. 4,421,678, 4,585,578 and 5,214,091.

Conductive compositions where carbon black is combined with another conductive material, such as graphite, are also known. U.S. Pat. No. 4,971,726 discloses use of a combination of carbon black and expanded graphite in thermoplastic resins. Also, U.S. Pat. Nos. 4,454,926 and 5,476,612 disclose the use of combinations of two conductive materials, at least one of which can include carbon black.

U.S. Pat. No. 5,360,701 discloses polyethylene compositions containing 7 to 10 percent carbon black in which from 20 to 100 percent by weight of the carbon black particles are conductive. Typically, the carbon black is a mixture of conductive and non-conductive carbon black particles. The compositions are utilized as an opaquing layer for the preparation of antistatic roll film backing paper assemblies.

Virtually all commercially produced carbon blacks possess some intrinsic conductivity as a result of their physical structure. The degree of conductivity, however, will vary widely depending on a number of factors, collectively referred to as the "structure" of the carbon black. These factors primarily include the particle size, degree of microporosity and the ability of the particles to form aggregates. In general, carbon blacks which have high or very high structure are referred to by manufacturers as "conductive" and, in some instances, "extra conductive" blacks. Structure is defined using the dibutyl phthalate (DBP) adsorption test. Carbon blacks with low structure characteristically have DBP adsorption numbers (ml. DBP adsorbed per 100 g. black) in the range 40 to 95 whereas DBP adsorption numbers greater than 100 are typically associated with high structure blacks.

When formulating carbon blacks with polyolefin resins to produce conductive or semiconductive compositions/composites, high structure blacks are preferentially employed. It is believed that the aggregates present in the high structure blacks, when dispersed in the polyolefin resin, provide a network within the polymer matrix through which electrons can flow. However, the use of a high structure conductive carbon black does not, by itself, insure that the resulting composite will have correspondingly high conductivity. The processing conditions used to disperse the black in the polyolefin resin also play an important role.

Processing conditions must be sufficient to adequately disperse the black but they cannot be so rigorous as to break down the carbon black structure, i.e., the aggregates. Uniform dispersion of the black is not only necessary to provide the continuous path of conductive particles within the polymer matrix required to achieve maximum conductivity, it is also essential if the composition is to be utilized in extrusion processes, such as for the production of films and coatings. Poor dispersion of black particles can restrict flow through dies with small openings resulting in films and coatings of uneven thickness and/or poor surface appearance. Uniform dispersion of the black is also necessary to achieve optimal opacity of films and coatings. On the other hand, excessive processing which breaks down the carbon black aggregates and results in diminished conductivity must be avoided The need to optimize and critically control processing conditions to avoid under or over dispersion of the black is a continual problem for the processor.

Various techniques have been suggested and used to broaden the processing window and minimize the problems associated with under or over processing. Efforts have focused primarily on increasing the amount of carbon black used; development of blacks which require less processing to attain optimum dispersion; surface treatment of the blacks; and addition of minor amounts of compatibilizing polymers. However, none of these approaches are completely acceptable—particularly where the compositions are to be extruded into films and coatings. While increasing the amount of carbon black may provide better conductivity, compositions with black levels greater than about 15 percent are generally considered to be unacceptable for extrusion coating and thin films. Furthermore, films and coatings having higher carbon black loadings have reduced flexibility and mechanical properties.

It would be highly advantageous if polyolefin compositions which are readily processable and extrudable into useful semiconductive films and coatings having good opacity and surface appearance were available. It would be even more desirable if the semiconductive polyolefin compositions used less than about 15 percent carbon black and, more preferably, less than about 12.5 percent carbon black so that the films and coatings had acceptable flexibility and mechanical properties. These and other advantages are realized with the compositions of the present invention which will be more fully described to follow.

SUMMARY OF THE INVENTION

The present invention relates to semiconductive polyolefin compositions which are readily processable and can be extruded into films and coatings having high conductivity, good opacity and good surface quality. Furthermore, in view of the ability to use carbon black levels of 15 percent and below, the resulting films and coatings also exhibit good flexibility and mechanical properties. The ability to obtain a superior balance of properties and processability is unexpectedly achieved through the use of a combination of two conductive blacks of differing structure.

More specifically, the improved compositions of the invention are comprised of (a) 85 to 94 weight percent polyethylene having a density of 0.910 to 0.935 g/cm$^3$ and melt index of 2 to 15 g/10 min; and (b) 6 to 15 weight percent of a carbon black mixture consisting essentially of (i) 10 to 90 percent highly conductive carbon black having a particle size of 10 to 50 nm, BET surface area greater than 500 m$^2$/g, DBP adsorption number of 200 to 600 ml/100 g and volatiles content of 2 percent or less; and (ii) 90 to 10 percent conductive carbon black having a particle size of 10 to 50 nm, BET surface area of 125 to 500 m$^2$/g, DBP adsorption number of 80 to 250 ml/100 g and volatiles content of 2 percent or less. The composition are further characterized as having a complex viscosity of 3000 to 10000 poise and dispersion number from 50 to 600. The compositions exhibit superior processability and can be extruded into thin films having good conductivity, uniform thickness and good appearance. Surface resistivity of the extruded films is typically less than 10 log ohms.

Polyethylenes employed for the invention are preferably ethylene homopolymers or copolymers of ethylene and C$_{3-8}$ α-olefins or polar comonomers having melt indexes from 3.5 to 12.5 g/10 min. Ethylene homopolymers with densities from 0.915 to 0.930 g/cm$^3$ are particularly useful.

The carbon black mixture is most typically comprised of 20 to 70 percent of a highly conductive black having a BET surface area of 600 to 2000 m$^2$/g and 30 to 80 percent of a conductive black having a BET surface area of 150 to 450 m$^2$/g. In an especially useful embodiment the highly conductive black (b)(i) has a BET surface area of 750 to 1300 m$^2$/g and DBP adsorption number of 300 to 500 and the second conductive black (b)(ii) has a BET surface area of 200 to 400 m$^2$/g and DBP adsorption number of 100 to 200. Highly useful compositions of the invention contain 87.5 to 92.5 percent polyethylene resin and 7.5 to 12.5 percent of the carbon black mixture and preferably have complex viscosities from 4000 to 9000 poise and dispersion numbers from 50 to 600.

The invention also relates to extruded films obtained using the above-identified compositions which can include cast monolayer film, blown monolayer film and multilayer films. For the latter, the compositions of the invention can comprise one or more of the layers of the multilayer composite. Similarly, the compositions of the invention can be extruded or coextruded onto flexible and/or rigid substrates. Films and coatings of the compositions generally range from 0.5 to 10 mils in thickness.

DETAILED DESCRIPTION OF THE INVENTION

The present invention relates to thermoplastic polyolefin resin compositions comprising polyethylene and a mixture of conductive carbon blacks which can be readily processed and extruded to provide useful semiconductive films and coatings. The semiconductive films and coatings, in addition to having low surface resistivity, also have good flexibility, mechanical properties, opacity and surface appearance.

Polyethylene resins utilized as the polymer matrix for the compositions of the invention are low density polyethylenes. This includes both homopolymers of ethylene, copolymers of ethylene and C$_{3-8}$ α-olefins and copolymers containing polar groups obtained by the copolymerization of ethylene with polar comonomers such as C$_{1-4}$ alkyl esters of acrylic and methacrylic acids. The copolymers of ethylene and polar comonomers typically contain from 5 to 45 weight percent and, more preferably, 10 to 35 weight percent of the comonomer and by way of illustration include ethylene-methyl acrylate and ethylene-n-butyl acrylate. The homopolymers and copolymers are produced using conventional high pressure polymerization techniques known to the art and, most generally, have densities from about 0.910 to about 0.935 g/cm$^3$ and melt indexes from 2 to 15 g/10 min. In a preferred embodiment, the polyethylene resin will have a density from 0.915 to 0.930 and melt index from 3.5 to 12.5. In another preferred embodiment of the invention, low density polyethylene homopolymers are employed to produce the improved compositions of the invention.

Minor amounts of other polyolefin resins produced using conventional Ziegler-Natta, Phillips-type or metallocene catalysts including linear low and medium density polyethylene, high density polyethylene and ultra high molecular weight polyethylene can be included with the low density polyethylene. When present, such resins will typically comprise no more than 30 weight percent of the total polyolefin component and, more preferably, will be blended with the low density polyethylene in amounts less than about 15 weight percent, based on the total polyolefin component.

To obtain the improved compositions of the invention a mixture of carbon blacks is necessarily employed with the low density polyethylene resin. The compositions will contain 85 to 94 weight percent polyethylene and 6 to 15 weight percent of the carbon black mixture. More preferably, the low density polyethylene resin or blend comprises from about 87.5 to 92.5 weight percent of the composition and the carbon black mixture is present from about 7.5 to 12.5 weight percent, based on the total weight of the composition.

The carbon black mixture is comprised of two conductive blacks of different structure. The first, carbon black, referred to herein as the first or highly conductive carbon black, has a BET surface area greater than 500 m$^2$/g and DBP adsorption number of 200 to 600 ml/100 g. The second carbon black used for the mixture has less structure with a BET surface area of 125 to 500 m$^2$/g and DBP adsorption number of 80 to 250 ml/100 g. Both the first, i.e., highly conductive, and second carbon blacks have particle sizes from 10 to 50 nm and volatiles contents are typically 2 percent or below.

The amount of the two blacks in the mixture can be varied but, most typically, the mixture contains 10 to 90 weight percent highly conductive black mixture and 90 to 10 weight percent of the second carbon black. In one useful embodiment of the invention, the highly conductive black constitutes 20 to 70 weight percent of the mixture and the second black is present in an amount from 30 to 80 percent of the mixture.

It is particularly advantageous if the first black has a BET surface area of 600 to 2000 m$^2$/g, the second black has a BET surface area of 150 to 450 m$^2$/g and the volatiles content of both the first and second blacks is less than 1.5 percent. In a highly useful embodiment, the first highly conductive carbon black has a BET surface area of 750 to 1300 m$^2$/g and DBP adsorption number of 300 to 500 ml/100 g and the second carbon black has a BET surface are of 200 to 400 m$^2$/g and DBP adsorption number of 100 to 200 ml/100 g.

Carbon blacks of the above types are known and available from commercial sources. For example, a representative highly conductive black which can be used for the invention is PRINTEX [trademark] XE 2 manufactured and sold by DeGussa Corporation, Pigments Group. Typical properties for this black, referred to by the manufacturer as an "extra" conductive black, are: volatiles 1.2 percent, particle size 35 nm, BET surface area 1000 $m^2/g$, and DBP adsorption number 400 ml/100 g. Another high structure black which meets the requirements of the highly conductive blacks of the invention is available from Cabot Corporation as BLACK PEARLS [trademark] 2000. This black has a BET surface are of 1475 $m^2/g$, DBP adsorption number of 330 ml/100 g, volatiles content of 2.0 percent and particle size of 12 nm. A useful carbon black which can be used as the second black in the mixture is PRINTEX [trademark] L 6, also manufactured by DeGussa Corporation, Pigments Group, which has a volatiles content of 1.2 percent, particle size of 18 nm, BET surface area of 265 $m^2/g$, and DBP adsorption number of 120 ml/100 g. PRINTEX [trademark] L, available from DeGussa Corporation, Pigments Group, and having a BET surface area of 150 $m^2/g$ and DBP adsorption number of 114 ml/100 g, and VULCAN [trademark] XC-72, available from Cabot Corporation and having a BET surface area of 254 $m^2/g$ and DBP adsorption number of 178 ml/100 g, are examples of other conductive blacks which can be utilized as the second component in the carbon black mixture.

In accordance with the present invention, compositions obtained by formulating low density polyethylene with the above-defined mixture of carbon blacks have sufficient processability so that they can be readily extruded. Moreover, extruded films and coatings produced from the compositions have high conductivity, surface appearance and physical properties. The high degree of processability and utility of the films and coatings obtained with the present compositions results from the specific combination of carbon blacks used and the ability to uniformly disperse the carbon black in the polyethylene without excessive breakdown of the carbon black structure. The ability to avoid or minimize under or over dispersion of the carbon black is essential for extrusion of films and coatings. If the carbon black is not acceptably dispersed, i.e., if large agglomerates of black are present, generally poor extrudability and inferior surface quality and opacity will result. In extreme cases, agglomerates may even be visible in the film or coating. On the other hand, if processing is excessive and the carbon black over dispersed, the black will not have the necessary structure to effectively transfer and dissipate charges through the polymer matrix.

As a result, the compositions of the invention have a specified complex viscosity and specified dispersion number to assure that the processing characteristics and dispersion of the carbon black are acceptable for extruded coatings and films. The compositions have complex viscosities from 3000 to 10,000 poise and, more preferably, 4000 to 9000 poise. If the complex viscosity is too high, the composition is too stiff to draw down or blow into thin film. On the other hand, if the complex viscosity is too low the material does not have sufficient melt strength and exhibits excessive "neck-in" during extrusion. In a particularly useful embodiment of the invention, the complex viscosity is 5000 to 8000 poise. Complex viscosity measurements were conducted in accordance with ASTM Standards D 4065 Practice for Determining and Reporting Dynamic Mechanical Properties of Plastics and D 4440 Standard Practice for Rheological Measurement of Polymer Melts Using Dynamic Mechanical Procedures. Specifically, dynamic rheological measurements were obtained using a Rheometrics [trademark] RDA II instrument equipped with parallel plates. Measurements were made at 210° C. with a frequency sweep from 100 to 0.0398 rad/sec and strain of 5 percent. Complex viscosities reported herein are determined at 100 rad/sec.

The present compositions have dispersion numbers from about 50 to about 600 and, more preferably, from 50 to 400. The dispersion number is an indication of the size and distribution of the carbon black agglomerates within the polymer matrix after processing. The method used to determine the dispersion number is analogous to the screen pack plugging test wherein change in head pressure in an extruder is measured as the composition is extruded. For the test a composition containing 10 weight percent carbon black is extruded using a Haake System 90 single screw extruder with a heated die (305° C.) with a breaker plate followed by a 60-60-325-60 mesh screen pack. Zones 1–3 in the extruder are heated to 235° C. and the extruder is operated at a screw speed of 150 rpm. The dispersion number is obtained by subtracting the pressure reading obtained at 5 minutes from the pressure reading obtained after 25 minutes. In a particularly useful embodiment of the invention the dispersion number of the composition is from 50 to 350.

Low density polyethylene compositions formulated with the above-described mixtures of blacks and having complex viscosities and dispersion numbers as specified are useful for the extrusion of monolayer and multilayer films and coatings. Films ranging in thickness from 0.5 to 10 mils and, more typically 0.75 to 5 mils, can be produced by extrusion processes, including blowing or casting. Both procedures are well known commercial operations. For cast film, the composition is melted and continuously extruded through a slot die onto a chilled roll where it is quenched and resolidified. For blown film, the molten composition is continuously extruded through an annular die to form a molten tube which is axially drawn and radially expanded before it is cooled. Blown and cast monolayer films produced using the compositions of the invention are semiconductive with surface resistivities less than 10 log ohms. Surface resistivities as low as 6 log ohms have been obtained. For the purpose of this invention, surface resistivities are determined on and reported for 1 mil thick monolayer films. Films produced from the present compositions also have good surface appearance and physical properties.

The semiconductive compositions may also be coextruded with one or more other thermoplastic resins and/or thermoplastic resin blends to produce blown or cast multilayer films. Coextrusion processes for producing multilayer films are known. The multilayer films may contain from 2 up to as many as 8 or more layers and the semiconductive compositions of the invention may comprise one or more of these layers. The semiconductive layer may comprise the skin, i.e., outside, layer or layers or may be present as one or more of the interior layers. Most typically, multilayer constructions produced with the present semiconductive compositions will have 2 to 5 layers.

While monolayer or multilayer films of the above types can be adhered to various substrates, the semiconductive compositions of the invention can be advantageously coated by extrusion or coextrusion onto rigid or flexible substrates, such as glass, fabric, foil, wood, paper, metal, composite materials or the like, to provide a semiconductive coating thereon. When coextruded, the present compositions can be applied with one or more other thermoplastic resins or thermoplastic resin blends. With certain articles, primarily papers and fabrics, a semiconductive monolayer or composite may be advantageously applied to both sides. Extruded and coextruded coatings will typically be applied at thicknesses ranging from 0.5 to 5 mils.

While it is not necessary, depending on the particular end use application, it may be advantageous to include one or more other additives in the compositions of the invention. In general, the type and amount of additive(s) will be consistent with conventional formulation practices employed with other thermoplastic resin compositions. Useful additives include but are not limited to antioxidants, such as hindered phenols, aromatic amines, thioethers, phosphites and phosphonites; processing aids such as fluoroelastomers; dispersing agents, such as stearic acid, waxes, calcium stearate, aluminum stearate and zinc stearate; and the like. These additives typically do not exceed about 1.5 weight percent of the total formulation and are, most commonly, employed at levels from 0.005 percent to about 1 percent. Fillers, such as calcium carbonate, talc, mica and the like may also be included in the formulations. When employed, the amount of filler(s) generally will not exceed about 20 weight percent of the total composition and, most commonly, will be employed at levels from about 1 up to about 15 weight percent.

In one highly useful embodiment of the invention a stabilizer comprised of a combination of a hindered phenol and an organic phosphite is employed at levels from about 0.01 up to about 0.75 weight percent based on the total composition. The weight ratio of the hindered phenol to organic phosphite can range from 4:1 to 1:4. In a particularly useful embodiment, the hindered phenol is tetrakis (methylene(3,5-di-tert-butyl-4-hydroxyhydrocinnamate)] methane and the organic phosphite is tris-(2,4-di-tert-butylphenyl)phosphite.

The following examples illustrate the invention more fully. Unless otherwise indicated, all parts and percentages reported in the examples are on a weight basis. Except for varying the amount and type of polyolefins and carbon blacks used in the examples, all of the formulations were prepared and evaluated using the same procedures. Also, all of the compositions of the invention and comparative compositions contained 0.030 weight percent of a stabilizer package comprised of equal parts hindered phenol and phosphite. The hindered phenol was tetrakis(methylene(3, 5-di-tert-butyl-4-hydroxyhydrocinnamate)]methane which is commercially available from Ciba-Geigy Corporation as Irganox [trademark] 1010. The phosphite stabilizer was tris-(2,4-di-tert-butylphenyl) phosphite which is commercially available from Ciba-Geigy Corporation as Irgafos [trademark] 168.

All of the formulations were compounded using a Farrel OOC Banbury mixer having a capacity of 2400 cc. All of the ingredients, i.e., polyolefin(s), carbon black(s) and stabilizer (s) were combined and the preheated (95° F.) chamber filled with the mixture. A pressure of 40 psi was then applied with mixing (125 rpm). When flux was achieved, i.e., the temperature of the mixture in the chamber reached approximately 270° F. (usually about 40–50 seconds), the ram was raised for 15 seconds and any material which collected in the throat of the mixer was scraped into the mixing chamber. Pressure was reapplied and mixing continued for at least 3 minutes or until the temperature reached 340° F. The melt was then pelletized at 360° F. using a 3.25 inch single screw extruder (L/D=23; 10 rpm) connected to an underwater pelletizer.

Each composition prepared in the above manner was evaluated to determine its complex viscosity, dispersion number, ability to be cast into 1 mil thick film and, assuming 1 mil film could be cast, surface resistivity, i.e., conductivity, of the film. Complex viscosity ($\eta^*$), which provides a measure of processability by determining the rheological properties of molten polymers over a range of temperatures by non-resonant forced vibration techniques, was determined in accordance with ASTM Test Methods D 4065 and D 4440 utilizing a Rheometrics [trademark] RDA II rheometer equipped with parallel 50 mm diameter plates and operated at 210° C. with a frequency sweep from 100 to 0.0398 rad/sec and strain of 5 percent. Complex viscosities are reported at a frequency of 100 rad/sec.

Dispersion number (DN) was determined utilizing a screen pack plugging procedure wherein the change in head pressure in an extruder is measured over time. The test was conducted using a Haake System 90 single screw extruder with a heated (305° C.) die with a breaker plate followed by a 60-60-325-60 mesh screen pack. Extruder zones 1–3 were heated to 235° C. and the extruder was operated at a screw speed of 150 rpm. Pressure readings (in psi) were taken at 5 and 25 minutes and the dispersion number is the difference between the readings, i.e., $DN=P_{25}-P_{5}$. For uniformity of comparison, all dispersion numbers are reported for a 10 weight percent carbon black loading. Thus, if a composition was formulated at a black level greater than 10 percent, it was let down into additional amount of the polyolefin resin to adjust the carbon black loading to 10 percent before conducting the pressure rise test and determining the dispersion number.

To prepare cast films, a Haake single screw extruder (¾ inch diameter; L/D=24) equipped with a slot die having a width of 6 inches and gap of 40 mil was used. The die temperature was 485° C. and the chill rolls was maintained at approximately 80° C. Distance from the die to the nip point (4 inches) and screw speed (70 rpm) were kept constant. The line speed, i.e., take-off, was adjusted to produce films of 1 mil thickness. The draw ratio was approximately 35:1.

Surface resistivity (SR) was determined on 1 mil cast films prepared in the above-identified manner using direct current procedures in accordance with ASTM Test Method D 257. Surface resistivity is the reciprocal of conductivity and is reported as log ohms.

EXAMPLE 1

A formulation was prepared in accordance with the invention using a low density polyethylene (LDPE) homopolymer having a melt index of 10 g/10 min. and density of 0.9230 g/cm$^3$. The LDPE was compounded with a mixture of two different conductive carbon blacks, specifically PRINTEX XE 2 Extra Conductive black and PRINTEX L 6 Conductive black available from DeGussa Corporation, Pigments Division. The first highly conductive black, i.e., XE 2, had a BET surface area of 1000 m$^2$/g, DBP adsorption number of 400 ml/100 g, particle size distribution of 35 nm and volatiles content of 1.2 percent. The second conductive black had a BET surface area of 265 m$^2$/g, DBP adsorption number of 120 ml/100 g, particle size distribution of 18 nm and volatiles content of 1.2 percent. The black mixture consisted of equal parts of the two conductive blacks. The formulation was as follows:

| LDPE | 89.77% |
| PRINTEX XE 2 | 5.00% |
| PRINTEX L 6 | 5.00% |
| Stabilizer Package | 0.03% |

After compounding the formulation had a complex viscosity of 6600 poise and dispersion number of 130. The composition exhibited good processability and was readily extrudable into uniform 1 mil cast film having good surface appearance and draw down characteristics. The surface of the film was smooth and defect, i.e., no pimples or specks were apparent upon visual inspection resulting from poor or non-uniform black dispersion. Surface resistivity of the 1 mil cast film was 7.1 log ohms.

COMPARATIVE EXAMPLES A AND B

To demonstrate the necessity of using a mixture of two different conductive carbon blacks in order to achieve the desired balance of complex viscosity, dispersion number and ability to cast 1 mil films with low surface resistance, two comparative formulations were prepared following the procedure using the LDPE of Example 1. While the formulations use the same LDPE and had the same total carbon black loading only one of the conductive blacks was utilized in each of the formulations. For Comparative Example A, all of the black was PRINTEX XE 2 Extra Conductive black and for Comparative Example B PRINTEX L 6 Conductive black was the only black used. Recipes for the two formulations were as follows:

| Comparative A: | |
| --- | --- |
| LDPE | 89.77% |
| PRINTEX XE 2 | 10.00% |
| Stabilizer Package | 0.03% |
| Comparative B: | |
| LDPE | 89.77% |
| PRINTEX L 6 | 10.00% |
| Stabilzer Package | 0.03% |

After compounding, Comparative Formulation A had a complex viscosity of 9670 and dispersion number of 120; however, the composition could not be extruded into acceptable 1 mil cast film under the test conditions due to film breakage during draw down. Comparative Formulation B had a complex viscosity of 4100 and dispersion number of 560. While the composition was extrudable into 1 mil cast film having acceptable appearance, the surface resistivity of the film was 14.6 log ohms which is unacceptable. It is evident from the above data that even though the complex viscosity and dispersion number of both comparative formulations are within the specified limits, when one of the conductive blacks is omitted it is not possible to extrude into 1 mil film or if, 1 mil film can be produced, the resulting film does not have surface resistivity of less than 10 log ohms. Neither carbon black component, when used by itself, gives a formulation which satisfies all of the requirements for the extrudable conductive compositions of the invention.

COMPARATIVE EXAMPLES C–G

Comparative formulations were prepared with other carbon blacks. In all of these comparative formulations the LDPE was the same as in Example 1 and the black level was 10 percent; however, only a single black was used as opposed to a mixture of conductive blacks. The blacks used for each of the comparative formulations were as follows:

Comparative C: BLACK PEARLS 2000 available form Cabot Corporation; BET surface area 1475 m²/gl; DBP adsorption number 300 ml/100 g.

Comparative D: KETJENBLACK [trademark] EC 300 J available from Akzo Chemical America; BET surface area 800 m²/g; DBP adsorption number 365 ml/100 g.

Comparative E: PRINTEX 3 available from DeGussa Corporation, Pigments Group; BET surface area 80 m²/g; DBP adsorption number 124 ml/100 g.

Comparative F: PRINTEX 40 available from DeGussa Corporation, Pigments Group; BET surface area 90 m²/g; DBP adsorption number 110 ml/100 g.

Comparative G: ENSACO [trademark] 250 available from MMM Carbon; BET surface area 65 m²/g; DBP adsorption number 190 ml/100 g.

After compounding in the usual manner, the complex viscosity and dispersion number were measured for each of the comparative formulations and, if the formulation had sufficient processability to enable it to be cast into acceptable 1 mil thick film, the surface resistance of the film was determined. Results are set forth in Table I.

The data clearly demonstrate that none of the carbon blacks, when used individually, produce compounded formulations satisfying all of the requirements of the extrudable compositions of the invention. Either the compositions did not possess sufficient processability for extrusion into 1 mil cast films or, if cast films could be produced, the 1 mil cast film did not have the requisite conductivity.

TABLE 1

| Formulation | η* (poise) | DN | 1 Mil Cast Film | SR (log ohms) |
| --- | --- | --- | --- | --- |
| C | 9300 | 223 | No[1] | — |
| D | 9500 | 90 | No[1] | — |
| E | 4120 | >1520 | Yes | >16.1 |
| F | 4030 | >1630 | Yes | >14.4 |
| G | 4000 | 95 | Yes | >13.8 |

[1]Edge tear was obtained during draw down and film thickness was not uniform.

EXAMPLE 2

To demonstrate the ability to vary the ratio of the two conductive carbon blacks, Example 1 was repeated except that the carbon black mixture comprised 40 percent PRINTEX XE 2 and 60 percent PRINTEX L 6. The compounded formulation had a complex viscosity of 6200 poise and dispersion number of 230. The formulation had good processability and produced cast film of uniform 1 mil thickness with good surface appearance. Surface resistivity of the 1 mil film was 9.4 log ohms.

EXAMPLE 3

Example 1 was repeated except that the total amount of the conductive carbon black mixture was increased to 12 percent. Specifically, the LDPE was compounded with 5 percent PRINTEX XE 2 and 7 percent PRINTEX L 6. The composition obtained after compounding had a complex viscosity of 8570 poise and dispersion number of 308. Cast film extrusion of the composition yielded high quality 1 mil film having a surface resistivity of 6.2 log ohms.

COMPARATIVE EXAMPLE H

To further demonstrate the need to employ a mixture of conductive carbon blacks, Example 3 was repeated omitting the PRINTEX XE 2. The comparative formulation contained 12 percent PRINTEX L 6 conductive black as the sole black component. While the resulting compounded product (complex viscosity 4500 poise and dispersion number 602) had good processability and could be cast into 1 mil film without problem, surface resistivity of the film was 13.7 log ohms.

EXAMPLE 4

A blend of LDPEs was formulated in accordance with the invention to produce extrudable compositions useful for the manufacture of high quality cast film having good conductivity. The LDPE blend was obtained by combining 23.3 parts of a first polyethylene homopolymer having a melt index of 10 g/10 min and density of 0.9230 g/cm³. With 66.7 parts of a second LDPE homopolymer having a melt index of 4.5 g/10 min and density of 0.9222 g/cm³. When compounded with 10 percent of a 50:50 mixture of PRINTEX XE 2 and PRINTEX L 6 using the standard procedure the resulting formulation had a complex viscosity of 6600 poise and dispersion number of 162. High quality semiconductive 1 mil extrusion cast film was produced from the composition without difficulty. The cast film had a surface resistivity of only 6.1 log ohms.

COMPARATIVE EXAMPLE I

To further illustrate the need to use two conductive blacks of different structure. Example 4 was repeated omitting the PRINTEX L 6. For this comparative example the LDPE blend was compounded with 10 percent PRINTEX XE 2 only. The resulting composition had a complex viscosity of 9670 poise and dispersion number of 120; however, it was not possible to fabricate 1 mil film using the extrusion cast procedure. The film could not be drawn down to 1 mil thickness without breakage.

EXAMPLE 5

Another LDPE blend was prepared by combining 66.7 parts polyethylene homopolymer having a melt index of 4.5 g/10 min and density of 0.9220 g/cm³ with 23.3 parts of another polyethylene homopolymer having a melt index of 8.0 g/10 min and density of 0.925 g/cm³. The blend was compounded with 5 percent PRINTEX XE 2 and 7 percent PRINTEX L 6 to obtain a formulation having a complex viscosity of 8570 poise and dispersion number of 308. The composition exhibited good processability and was extruded into 1 mil cast film having good surface appearance and surface resistivity of 6.2 log ohms.

COMPARATIVE EXAMPLE J

Example 5 was repeated except that no PRINTEX XE 2 was included in the formulation. The only conductive carbon black used for this comparative example was PRINTEX L 6 which was present at a 12 percent level. While the compounded formulation had a complex viscosity of 4520 poise and dispersion number of 602 and could be extrusion cast into 1 mil film, the film had a rough surface with specks due to poor dispersion and surface resistivity greater than 14 log ohms.

EXAMPLE 6

To demonstrate the ability to use other conductive carbon blacks having the requisite characteristics, Example 1 was repeated substituting 5 percent BLACK PEARLS 2000 (BET surface area 1475 m²/g; DBP adsorption number 300 ml/100 g; mean particle size of 12 nm; volitales content 2.0 percent) for the PRINTEX XE 2. All other components in the formulation and conditions were the same. After compounding the formulation, a complex viscosity was 5230 poise and dispersion number was 300. The composition had good processability and was readily extruded into 1 mil cast film. Surface resistivity of the 1 mil cast film was 9.1 log ohms.

EXAMPLE 7

To further demonstrate the ability to vary the proportions of the conductive blacks in the formulations of the invention, the following example is provided. For this experiment, Example 1 was repeated except that 2 percent PRINTEX XE 2 and 8 percent PRINTEX L 6 were used with the LDPE and stabilizer package. The complex viscosity and dispersion number of the resulting composition were 5630 poise and 260, respectively, after the compounding. The composition had good processability and was readily extruded and drawn down into 1 mil thick cast film having surface resistivity of 9.7 log ohms. The cast film had good surface appearance and uniform thickness.

COMPARATIVE EXAMPLES K AND L

Two formulations were prepared for comparative purposes to demonstrate the need to use a conductive blacks within the specified BET surface area and DBP adsorption number ranges. These formulations were prepared following with the procedure of Example 1 except that for Comparative Example K the PRINTEX L 6 was replaced with PRINTEX 40 (BET surface area of 90 m²/g and DBP adsorption number of 110 ml/100 g) and for Comparative Example L, the PRINTEX L 6 was replaced with PRINTEX 95 (BET surface area of 250 m²/g and DBP adsorption number of 52 ml/100 g). Complex viscosities and dispersion numbers for the compounded compositions and surface resistivities of the films cast therefrom were as follows:

| Comparative Example K: | Comparative Example L: |
|---|---|
| η* 5500 poise | η* 6200 poise |
| DN 730 | DN 2250 |
| SR 8.3 log ohms | SR 9.4 log ohms |

While both of the comparative formulations were capable of being cast into 1 mil thick films, the film quality was unacceptable as evidenced by the unacceptable dispersion numbers. Films produced from both of comparative formulations did not have a smooth appearance and also had unacceptable opacity.

We claim:

1. An extrudable semiconductive polyolefin composition comprising:
  (a) 85 to 94 weight percent ethylene polymer having a density of 0.910 to 0.935 g/cm³ and melt index of 2 to 15 g/10 min; and
  (b) 6 to 15 weight percent of a carbon black mixture consisting essentially of
    (i) 10 to 90 percent first conductive carbon black having a particle size of 10 to 50 nm, BET surface area greater than 500 m²/g, dibutyl phthalate adsorption number of 200 to 600 ml/100 g and volatiles content of 2 percent or below; and
    (ii) 90 to 10 percent second conductive carbon black having a particle size of 10 to 50 nm, BET surface area of 125 to 500 m²/g, dibutyl phthalate adsorption number of 80 to 250 ml/100 g and volatiles content of 2 percent or below.

2. The composition of claim 1 wherein (a) is present in an amount from 87.5 to 92.5 weight percent and (b) is present in an amount from 7.5 to 12.5 weight percent.

3. The composition of claim 1 wherein the ethylene polymer is selected from the group consisting of ethylene homopolymers, copolymers of ethylene and $C_{3-8}$ α-olefins and copolymers of ethylene and polar comonomers.

4. The composition of claim 3 wherein the ethylene polymer has a melt index of 3.5 to 12.5 g/10 min.

5. The composition of claim 3 wherein the ethylene polymer is an ethylene homopolymer having a density from 0.915 to 0.930 g/cm³.

6. The composition of claim 1 which has a complex viscosity from 3000 to 10000 poise.

7. The composition of claim 1 which has a dispersion number from 50 to 600.

8. The composition of claim 1 wherein the carbon black mixture contains 20 to 70 percent (i) and 30 to 80 percent (ii).

9. The composition of claim 8 wherein (i) has a BET surface area of 600 to 2000 m$^2$/g, (ii) has a BET surface area of 150 to 450 m$^2$/g, the complex viscosity is 4000 to 9000 poise and the dispersion number is 50 to 400.

10. The composition of claim 9 wherein (i) has a BET surface area of 750 to 1300 m$^2$/g, dibutyl phthalate adsorption number of 300 to 500 ml/100 g and volatiles content less then 1.5 percent.

11. The composition of claim 9 wherein (ii) has a BET surface area of 200 to 400 m$^2$/g, dibutyl phthalate adsorption number of 100 to 200 ml/100 g and volatiles content less than 1.5 percent.

12. The composition of claim 9 wherein the complex viscosity is 5000 to 8000 poise.

13. The composition of claim 1 additionally containing up to 1.5 weight percent stabilizer selected from the group consisting of hindered phenols, aromatic amines, thioethers, phosphites and phosphonites.

14. The composition of claim 13 wherein the stabilizer is a mixture of hindered phenol and organic phosphite present at a weight ratio from 4:1 to 1:4.

15. The composition of claim 14 wherein the stabilizer is present in an amount from 0.01 to 0.75 weight percent, the hindered phenol is tetrakis(methylene(3,5-di-tert-butyl-4-hydroxyhydrocinnamate)]methane and the organic phosphite is tris-(2.4-di-tert-butylphenyl)phosphite.

16. A semiconductive extruded film having a surface resistivity less than 10 log ohms produced from a composition having a complex viscosity of 3000 to 10000 poise, dispersion number from 150 to 600 and comprising:

(a) 85 to 94 weight percent ethylene polymer having a density of 0.910 to 0.935 g/cm$^3$ and melt index of 2 to 13 g/10 min; and (b) 6 to 15 weight percent of a carbon black mixture consisting essentially of (i) 10 to 90 percent highly conductive carbon black having a particle size of 10 to 50 nm, BET surface area greater than 500 m$^2$/g, dibutyl phthalate adsorption number of 200 to 600 ml/100 g and volatiles content of 2 percent or below; and (ii) 90 to 10 percent conductive carbon black having a particle size of 10 to 50 nm, BET surface area of 125 to 500 m$^2$/g, dibutyl phthalate adsorption number of 80 to 250 ml/100 g and volatiles content of 2 percent or below.

17. The semiconductive extruded film of claim 16 having a thickness of 0.5 to 10 mils.

18. The semiconductive extruded film of claim 17 which is a cast monolayer film.

19. The semiconductive extruded film of claim 17 which is a blown monolayer film.

20. The semiconductive extruded film of claim 17 which comprises one or more of the layers of a multilayer film obtained by coextrusion with one or more thermoplastic resins or thermoplastic resin blends.

21. The semiconductive extruded film of claim 17 which is extruded onto a flexible or rigid substrate.

22. The semiconductive extruded film of claim 17 which is coextruded onto a flexible or rigid substrate with one or more thermoplastic resins or thermoplastic resin blends.

23. The semiconductive extruded film of claims 16–22 wherein (a) is present in an amount of 87.5 to 92.5 weight percent, (b) is present in an amount from 7.5 to 12.5 weight percent, (i) has a BET surface area of 600 to 2000 m$^2$/g and (ii) has a BET surface area of 150 to 450 m$^2$/g.

24. The semiconductive extruded film of claim 23 wherein the ethylene polymer is an ethylene homopolymer having a melt index of 3.5 to 12.5 g/10 min and density from 0.915 to 0.930 g/cm$^3$ and the carbon black mixture contains 20 to 70 percent (i) and 30 to 80 percent (ii).

25. The semiconductive extruded film of claim 24 wherein the complex viscosity is 4000 to 9000 poise and dispersion number is 50 to 400.

26. The semiconductive extruded film of claim 25 wherein (i) has a BET surface area of 750 to 1300 m$^2$/g and dibutyl phthalate adsorption number of 300 to 500 ml/100 g and (ii) has a BET surface area of 200 to 400 m$^2$/g and dibutyl phthalate adsorption number of 100 to 200 ml/100 g.

27. The semiconductive extruded film of claim 26 wherein the complex viscosity is 5000 to 8000 poise.

28. The semiconductive extruded film of claim 24 which additionally contains 0.01 to 0.75 weight percent of a stabilizer which is a mixture of tetrakis(methylene(3,5-di-tert-butyl-4-hydroxyhydrocinnamate)]methane and tris-(2,4-di-tert-butylphenyl)phosphite present at a weight ratio of 4:1 to 1:4.

* * * * *